United States Patent
Norris et al.

(10) Patent No.: US 7,506,664 B2
(45) Date of Patent: Mar. 24, 2009

(54) AUTOMOTIVE COOLANT CONTROL VALVE

(75) Inventors: Robert Norris, Hilliard, OH (US); R. Allan McLane, Powell, OH (US)

(73) Assignee: Ranco Incorporated of Delaware, Carol Stream, IL (US)

( * ) Notice: Subject to any disclaimer, the term of this patent is extended or adjusted under 35 U.S.C. 154(b) by 399 days.

(21) Appl. No.: 11/412,470

(22) Filed: Apr. 27, 2006

(65) Prior Publication Data
US 2007/0252015 A1  Nov. 1, 2007

(51) Int. Cl.
*F16K 11/074* (2006.01)
*F16K 11/07* (2006.01)
*F16K 11/078* (2006.01)
*F16K 31/02* (2006.01)
*F01P 7/02* (2006.01)

(52) U.S. Cl. .......................... 137/625.46; 137/625.42; 137/625.17; 251/129.11; 236/34.5

(58) Field of Classification Search ............ 137/625.42, 137/625.46, 625.17, 625.19, 625.21; 251/129.11, 251/129.08; 236/93 R; 123/41.08, 41.09
See application file for complete search history.

(56) References Cited

U.S. PATENT DOCUMENTS 6,164,248 A * 12/2000 Lehmann ............... 123/41.1
6,240,946 B1 * 6/2001 Beasley ................ 137/15.06

FOREIGN PATENT DOCUMENTS

WO    WO 2004061342 A1 *  7/2004

* cited by examiner

*Primary Examiner*—Chen-Wen Jiang
(74) *Attorney, Agent, or Firm*—Reinhart Boerner Van Deuren P.C.

(57) ABSTRACT

A flow control valve for selectively routing a coolant in a dual-zone heater system is provided. The flow control valve includes a housing and a flow control device. The housing includes an inlet port, a bypass outlet, a front heater outlet, and a rear heater outlet communicating through an internal cavity. The flow control device, which can be a cylinder, sphere, etc., is rotatably positioned in the internal cavity. The flow control device has an axial channel and generally radial aperture. The axial channel transports the coolant received from the inlet port through the flow control device, and the aperture delivers the coolant to one or more of the bypass outlet, the front heater outlet, and the rear heater outlet as the flow control device is rotated. In this way the circuit is not deadheaded.

17 Claims, 5 Drawing Sheets

AUTOMOTIVE COOLANT CONTROL VALVE

FIELD OF THE INVENTION

The present invention generally relates to automotive heating systems and, in particular, to a control valve for controlling coolant within an automotive heating system.

BACKGROUND OF THE INVENTION

A conventional automobile includes a heater (i.e., heating system) configured to selectively introduce warm air into a passenger compartment. As the warm air is circulated throughout the passenger compartment, the temperature within the passenger compartment is elevated to within a desired temperature range. Therefore, the occupants seated in passenger compartment of the automobile are kept comfortable.

The typical heater noted above includes, among other things, a control valve, a heater core, and a fan. The flow of heated coolant to the heater core is generally directed through flexible tubing or some other type of conduit. This heater loop is typically coupled in parallel to the radiator loop of the vehicle. As the engine is operated, the temperature of the coolant rises. The control valve is used to manage a flow of the heated coolant from the engine compartment to the heater core. The more heated coolant that the control valve allows to proceed to the heater core, the warmer the heater core becomes. Using the fan to move air over and around the warm heater core, the temperature within the passenger compartment is raised to within the desired temperature range.

Many of the control valves mentioned also include a bypass outlet. The bypass outlet permits the control valve to route the heated coolant back toward the radiator without the coolant passing through the heater core. Because the heater core is generally located within the passenger compartment, the ability of the control valve to utilize the bypass outlet is especially beneficial on a warm or hot day when additional heat in the passenger compartment is not desired. Using the bypass outlet, the control valve simply keeps the heated coolant in the engine compartment and away from the occupants of the vehicle. The bypass outlet also permits a pump moving the coolant through the heating system to continue operating even when heat is not called for.

To ensure that the entire passenger compartment is evenly heated or that certain areas of the passenger compartment are provided with additional heat, some newer and/or larger automobiles include more than one heater. For example, a large sport utility vehicle, van, or bus may include both a front heater and a rear heater. By using front and rear control valves and heater cores, the front heater manages the amount of heat expelled into a front portion of the passenger compartment while the rear heater controls the amount of heat expelled into a rear portion. To ensure that heat is not undesirably expelled into the passenger compartment, the front and rear heaters employ control valves so that occupants in both the front and rear of the passenger compartment are kept comfortable on hot and cold days.

In those applications where the ability to individually control the flow of the heated coolant to both front and rear heater cores in front and rear heaters is required, and where a bypass outlet is needed, the typical solution has been to employ some combination of control valves, tees, and other components coupled together by flexible interconnecting tubing. In at least one such application, the flow of heated coolant to the front heater core is controlled by a bypass valve and the flow of heated coolant to the rear heater core is controlled by a two-port on-off valve.

Unfortunately, each control valve, actuator used to manipulate the control valve, tree, connecting device, length of tubing connecting the various components together, and like heater components increases the overall cost of the multiple heater system. In addition, each of the components is subject to wear, failure, and/or leakage and, consequently, replacement. Having to replace worn, failed, or leaking components is a time consuming endeavor and will also increased system costs. Therefore, multiple heater systems with a large number of components are disfavored.

There exists, therefore, a need in the art for a flow control valve that simplifies the plumbing and packaging of multiple heater systems without sacrificing the ability to independently control the individual heaters. The invention provides such a control valve. These and other advantages of the invention, as well as additional inventive features, will be apparent from the description of the invention provided herein.

BRIEF SUMMARY OF THE INVENTION

The invention provides a flow control valve that simplifies the plumbing and packaging of a multiple heater system without sacrificing the ability to independently control the individual heaters. To accomplish this task, the flow control valve uses a rotatable cylinder as a passageway and as a coolant directing device. By incorporating a bypass outlet into its overall design, the flow control valve also permits continuous circulation of the coolant even when heat in a passenger compartment of a vehicle is not called for or turned off. Moreover, the heated coolant is not undesirably carried into the passenger compartment of the vehicle such that the heater cores are allowed to radiate heat on warm and hot days.

In one embodiment of the present invention, the flow control valve includes four ports, i.e. one inlet port, a front heater outlet port, a rear heater outlet port and a bypass port. Control of fluid flow through the various ports of the flow control valve is provided by an actuator that controls the positioning of a flow directing cylinder positioned between the inlet port and the outlet ports. Positioning of the cylinder allows for full bypass operation, full front heater operation, proportional front and rear heater operation, and combinations thereof.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
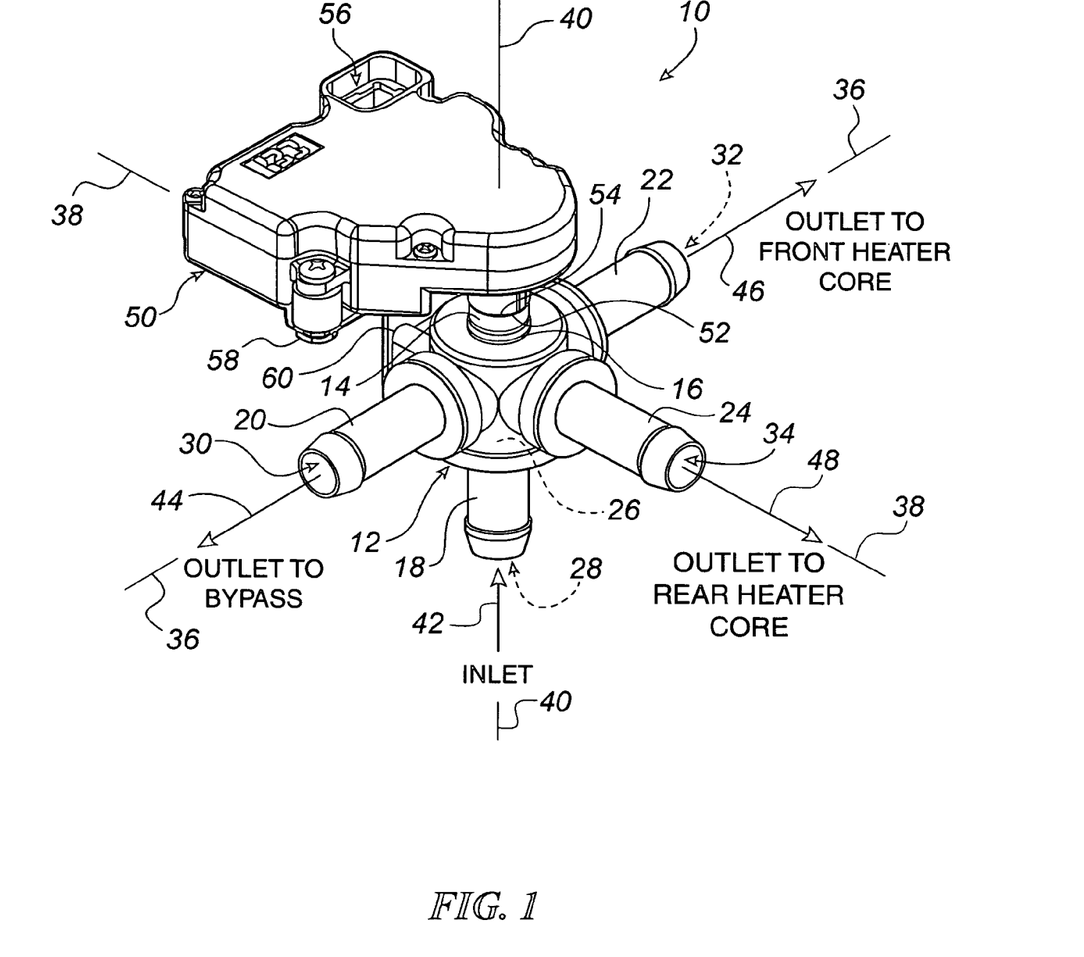
FIG. 1 is a perspective view of an exemplary embodiment of a flow control valve constructed in accordance with the teachings of the present invention.

Referring to FIG. 1, an embodiment of a flow control valve 10 for selectively routing a fluid constructed in accordance with the teachings of the present invention is illustrated. In an exemplary embodiment for use in an automotive heating system, the fluid is an engine coolant, although in other applications a hydraulic fluid or other types of fluid may be controlled thereby. However, while the present invention may be well suited in various applications, the following description will utilize the exemplary environment of a dual zone heater application in the automotive industry. Those skilled in the art, however, will recognize that such description is provided by way of example only, and not by way of limitation.

The flow control valve 10 comprises a housing 12 and a rotatable cylinder 14. The housing 12 may be formed from a variety of suitable materials such as, plastic, steel, and the like, depending on the particular application or environment in which the flow control valve 10 will be used. The housing 12 has a top aperture 16 generally filled by a protruding portion of the cylinder 14. The housing 12 also includes an inlet port 18, a bypass outlet 20, a front heater outlet 22, and a rear heater outlet 24 in fluid communication with an internal cavity 26. The inlet port 18 and outlets 20-24 are preferably integrally formed with the housing 12. In alternate embodiments, they are separate elements secured to the housing through well known connecting techniques such as, for example, ultrasonic bonding, welding, mating threads, and the like.

In one embodiment, the inlet port 18 and outlets 20-24 are somewhat cylindrical appendages extending radially outward from a central vertical axis 40. Therefore, the inlet port 18 and each of the outlets 20-24 includes an elongate channel 28, 30, 32, 34 facilitating the transportation of the fluid either into or out of the internal cavity 26 of the flow control valve 10.

In one embodiment the inlet port 18 and each of the outlets 20-24 are orthogonal to each other. In addition, each of the outlets 20-24 is co-planar with the other outlets on a plane formed by a horizontal axis 36 passing centrally through the bypass outlet 20 and the front heater outlet 22 and another horizontal axis 38 passing centrally through the rear heater outlet 24. As depicted, the bypass outlet 20 and the front heater outlet 22 are disposed on opposing sides of the housing 12 along the horizontal axis 36. Also, the inlet port 18 depends downwardly, as oriented in FIG. 1, from the housing 12 along a vertical axis 40 passing centrally through the inlet port 18. Despite the configuration of the inlet port 18 and the outlets 20-24 in the illustrated embodiment of FIG. 1, other arrangements are possible without deviating from the spirit of the invention.

As shown by fluid direction arrow 42, the inlet port 18 is employed to transport fluid into the housing 12. In contrast, as shown by fluid direction arrows 44, 46, 48, each of the outlets 20-24 is able to carry fluid out of the housing 12. Although shown having approximately equal sizes, in various embodiments the inlet port 18 and outlets 20-24 have different sizes, shapes, lengths, and other dimensions as needed to accommodate various applications. Likewise, more or fewer of the inlet ports 18 and the outlets 20-24 are used depending on the particular purpose or use of the flow control valve 10.

The cylinder 14 extends into the internal cavity 26 (see also FIG. 2) and is rotatable relative to the housing 12. In one embodiment, the cylinder 14 is rotatably driven by an actuator 50. The cylinder 14 generally includes a coupling member 52 or device that mates with a similar coupling member 54 or device on the actuator 50. In one embodiment, the actuator 50 includes an electrical motor having an electrical coupling 56. The electrical coupling 56 is configured to mate with a corresponding electrical coupling (not shown) of, for example, a main computer in a vehicle such that activation and control of the actuator 50 is computer-controlled. In one embodiment, one or both of the actuator 50 and the housing 12 include mounting hardware 58, 60 to secure the flow control valve 10 in place.

Also, despite the housing 12 and the cylinder 14 being illustrated as generally cylindrical in shape, in one embodiment one or both of the housing and the cylinder are spherical, elliptical, barrel, or otherwise shaped. In such an embodiment, the flow control valve 10 resembles and/or operates like, for example, a ball valve, a butterfly valve, and other well known and commonly used valves.

Figure 2:
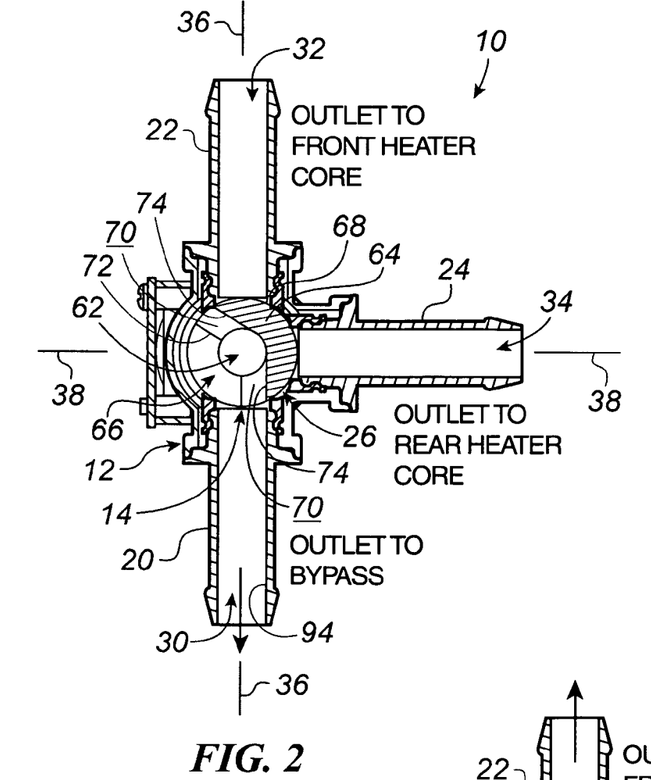
FIG. 2 is a vertical cross section view of the flow control valve of FIG. 1 illustrating a rotatable cylinder in a first position.

As illustrated in FIG. 2, the cylinder 14 includes an axial channel 62, a blocking wall 64, and an aperture 66. The axial channel 62 generally passes through a bottom face of the cylinder 14 and extends or travels through a central portion of the cylinder 14 until terminating near the aperture 66 and the blocking wall 64. The axial channel 62 establishes a path through the lower portion of the cylinder 14 to place the inlet port 18 in fluid communication with the aperture 66. Therefore, the channel 28 of the inlet port 18 is aligned with the axial channel 66 of the cylinder 14.

The ability of the fluid to pass directly through the axial channel 62 of the cylinder 14 is not diminished or lost when the cylinder 14 is rotated. Because the fluid is able to pass from the channel 28 in the inlet port 18 through the cylinder 14 via the axial channel 62, the overall package or size of the flow control valve 10 is reduced. Also, in one embodiment the channel 28 and the axial channel 62 are co-axial with the vertical axis 40 (best illustrated in FIG. 1). This arrangement ensures or promotes a smooth or laminar fluid flow of the fluid passing through the cylinder 14.

Still referring to FIG. 2, the blocking wall 64 and the aperture 66 are generally on opposing sides of the axial channel 62. In one embodiment, the blocking wall 64 extends around a majority of an outer periphery 68 of the cylinder 14. As such, the blocking wall 64 appears crescent-shaped when a cross section is viewed from above as in FIG. 2. The blocking wall 64 is able to direct the fluid, which flows through the axial channel 62, through the aperture 62 while simultaneously preventing the fluid from flowing through one or more of the bypass outlet 20, the front heater outlet 22, and the rear heater outlet 24 as the cylinder 14 is rotated.

In one embodiment, the blocking wall 64 includes sloped surfaces 70 on opposing sides of the axial channel 62. The slope surfaces 62 generally slope upwardly away from lower edges 72 of the blocking wall 64 and toward upper edges 74. The sloped surfaces 70 aid the blocking wall 64 in directing the fluid.

As noted above, the aperture 66 is formed through the cylinder 14 to provide a passageway for the fluid to flow from the axial channel 62. The aperture 66 forms a rectangle, a circle, an ellipse, or other shape when viewed from the outer periphery 68 of the cylinder 14 in one embodiment. Preferably, the aperture is located proximate the location where the plane formed by the horizontal axes 36, 38 passes through the cylinder 14. Therefore, as the actuator 50 rotates the cylinder 14, the aperture 66 aligns with one or more of the outlets 20-24 so that fluid can continuously flow through the valve 10.

Depending on where the actuator 50 has driven the cylinder 14, the aperture 66 may align with one of the outlets 20-24 fully, partially or a combination of outlets 20-24. When, for example, the aperture 66 is fully aligned with the bypass outlet 20 as shown in FIG. 2, the entire flow of fluid flows from the axial channel 62 through the channel 30 in the bypass outlet 20. However, when the aperture 66 is partially aligned with each of the front and rear heater outlets 22, 24 (see FIG. 6 and description supra.), the fluid flows from the axial channel 62 through each of the channels 32, 24 in those two particular outlets. In other words, the flow of fluid is proportionally split between the two outlets 22, 24 based upon the degree of alignment between each outlet and the aperture 66 as will be discussed more fully below.

Figure 3:
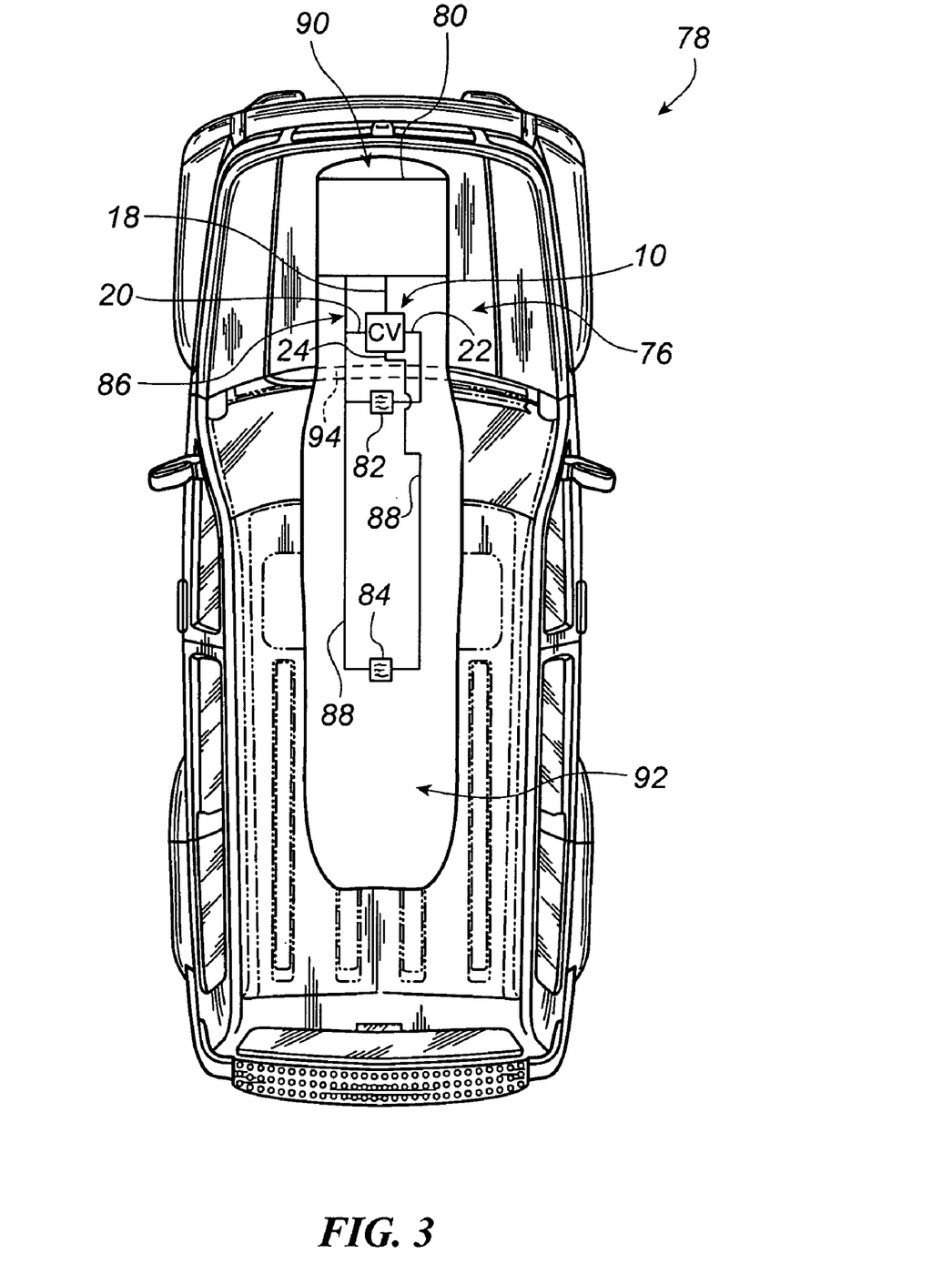
FIG. 3 is a top view of an automobile having a cut away portion revealing the flow control valve of FIG. 1 incorporated into a heating system.

To gain perspective for the exemplary environment being discussed, and referring now to FIG. 3, the flow control valve 10 is illustrated as incorporated within a heating system 76 of a typical vehicle 78 (e.g., an automobile). In addition to the flow control valve 10 and various other components, the heating system 76 receives heated coolant from the engine 80 and delivers it to one or a combination of a front heater core 82, a rear heater core 84 and a bypass 86 coupled together by conduit 88 (e.g., reinforced flexible rubber tubing, radiator hose, metal piping, etc.).

The vehicle 78 is divided into an engine compartment 90 and a passenger compartment 92 by a firewall 94. As shown, the engine 80, control valve 10, the bypass 86 are disposed in the engine compartment 90 of the vehicle 78 while the first and second heater cores 82, 84 are found in the passenger compartment 92. The front and rear heater cores 82, 84 are in spaced relation with each other with the second heater core being farther away from the engine compartment 90 than the front heater core. Therefore, the front heater core 82 is tasked with heating the occupants seated in the front of the vehicle 78 (e.g., in the front seat) and the rear heater core 84 is expected to heat the occupants seated in the rear of the vehicle (e.g., in the rear seat). By spacing the front and rear heater cores 82, 84 apart, the vehicle 78 is generally more evenly or selectively heated to ensure the comfort of the occupants.

In operation, the flow control valve 10 is able to selectively route the fluid, which for the purpose of illustration in this case is a heated coolant, to each of the front and rear heater cores 82, 84 or to the bypass 86 leading back toward the engine 80. When the control valve 10 is in a first position as illustrated in FIG. 2, the aperture 66 is aligned with the bypass outlet 20 and the blocking wall 64 is aligned with each of the front and rear heater outlets 22, 24. In the illustrated embodiment, the upper edge 74 of the blocking wall 64 and the inner wall 94 of the channel 30 are linear. In this first position, the flow control valve 10 prevents the flow of the coolant to front and rear heater cores 82, 84 and requires the coolant to flow through the bypass outlet 20.

Because the front and rear heater cores 82, 84 are not provided with a flow of the heated coolant from the engine 80, the cores will not radiate heat into the passenger compartment 92 of the vehicle 78. This outcome is much appreciated by passengers of the vehicle 78 on a warm or hot day when excess heat in the passenger compartment is undesirable. In addition, even though the coolant is not allowed to reach to reach the front and rear heater cores 82, 84, the coolant is still able to circulate through the engine compartment 90. In fact, the coolant still circulates through the flow control valve 10, the bypass 86, and the engine 80. As such, even when the flow of fluid to the front and rear heater cores 82, 84 is restricted, the coolant is able to flow and the entire flow branch is not "dead-headed" when the heat is turned off inside the vehicle 78.

As the cylinder 14 is rotated by the actuator in a clockwise direction 96 from the first position in FIG. 2, the aperture 66 begins to partially align with the front heater outlet 22. Simultaneously, the blocking wall 64 begins to partially align with the bypass outlet 20. As a result, the heated coolant begins to flow through the front heater outlet 22 and the amount of the heated coolant flowing through the bypass outlet 20 begins to diminish. When, for example, the cylinder 14 has been rotated between about thirty-five and forty degrees relative to the first position in the illustrated embodiment, the heated coolant flows approximately equally through the bypass outlet 20 and the front heater outlet 22. Therefore, with reference to FIG. 3, the bypass 86 and the front heater core 82 receive an even portion of the heated coolant.

Figure 4:
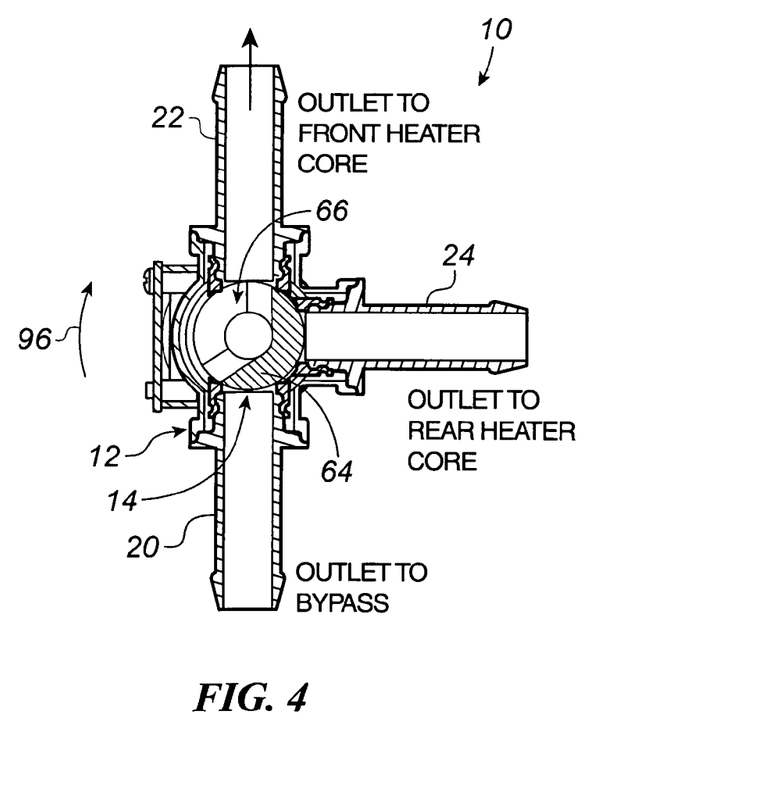
FIG. 4 is a vertical cross section view of the flow control valve of FIG. 1 illustrating the rotatable cylinder rotated clockwise about sixty-five degrees from the first position.

Referring to FIG. 4, when the cylinder 14 has been rotated by the actuator 50 degrees farther in the clockwise direction, for example, between about sixty-five and ninety degrees relative to the first position shown in FIG. 2, the aperture 66 aligns fully with the front heater outlet 22. Also, the blocking wall 64 aligns with the rear heater outlet 24 and the bypass outlet 20. As a result, the aperture 66 permits the heated coolant to flow exclusively to the front heater outlet 22 while the blocking wall 64 restricts the coolant from flowing through the bypass outlet 20 and the rear heater outlet 24. Therefore, the heated coolant from the engine 80 circulates through only the front heater core 82 and not through the bypass 86 or the rear heater core 84.

Figure 5:
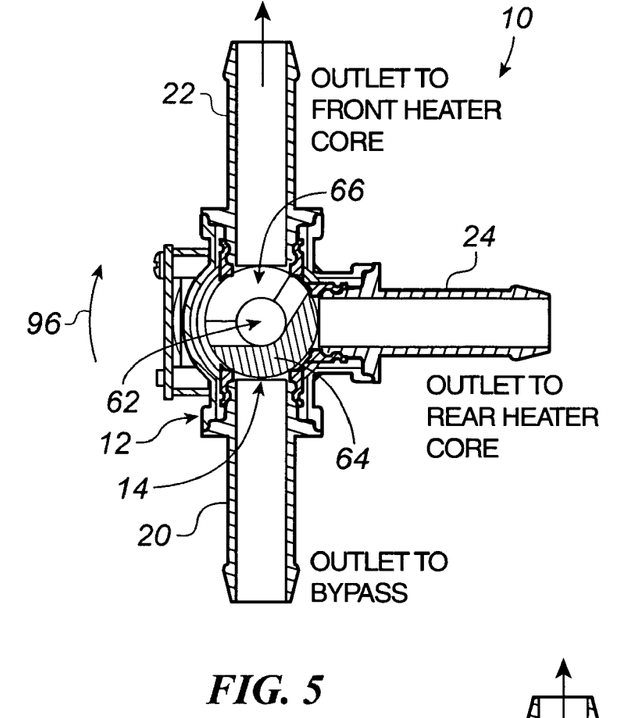
FIG. 5 is a vertical cross section view of the flow control valve of FIG. 1 illustrating the rotatable cylinder rotated clockwise about ninety-five degrees from the first position.

Referring now to FIG. 5, when the cylinder has been rotated by the actuator 50 farther in a clockwise direction, for example, just over about ninety-five degrees relative to the first position, the aperture 66 begins to align with the rear heater outlet 24 as well as continue to align with the front heater outlet 22. As this rotation continues, the blocking wall 66 begins to rotate out of alignment with and/or past the rear heater outlet 24 yet continues to block the bypass outlet 20. As a result, the aperture 66 permits the heated coolant to flow both to the front heater outlet 22 and the rear heater outlet 24 while the blocking wall 64 restricts the coolant from flowing through the bypass outlet 20. Therefore, the heated coolant circulates through both the front heater core 82 and the rear heater core 84 but not the bypass 86.

As the cylinder 14 continues to rotate, up to about one hundred thirty degrees relative to the first position, the rear heater outlet 24, and therefore the rear heater core 84, is provided with an increasing share of the heated coolant. The front heater outlet 22, and therefore the front heater core 82, is provided with a decreasing share of the heated coolant. As such, the heat produced by the heating system 76 is distributed proportionally between the front and the rear of the vehicle 78. Even so, by rationing heat to both the front and rear portions of the passenger compartment 92, the occupants of both the front and back seats are kept warm and comfortable.

Figure 6:
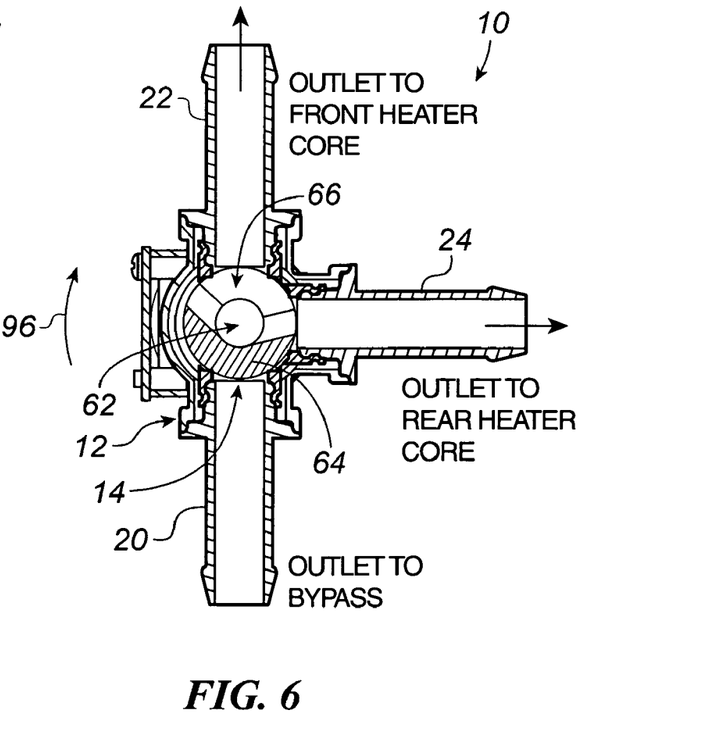
FIG. 6 is a vertical cross section view of the flow control valve of FIG. 1 illustrating the rotatable cylinder rotated clockwise about one hundred thirty degrees from the first position.

Moving to FIG. 6, when the cylinder 14 is rotated, for example, about one hundred and thirty degrees relative to the first position, the aperture 66 and the blocking wall 64 work together to route about sixty percent of the coolant through the front heater outlet 22 and about forty percent of the coolant through the rear heater outlet 24. The aperture 66 generates effective flow areas through each of the front and rear heater outlets 22, 24 in this ratio to ensure that proper and/or desirable heater system 76 balance is maintained.

To return the cylinder 14 back to the first position illustrated in FIG. 2, the actuator 50 rotates the cylinder in a counterclockwise direction about one hundred and thirty degrees. In one embodiment, the actuator 50 rotates the cylinder 14 farther in the clockwise direction 96 until the bypass only position of FIG. 2 is attained. Once in the first position, the heated coolant again flows only through the bypass outlet 20 and the bypass 86.

Figure 7:
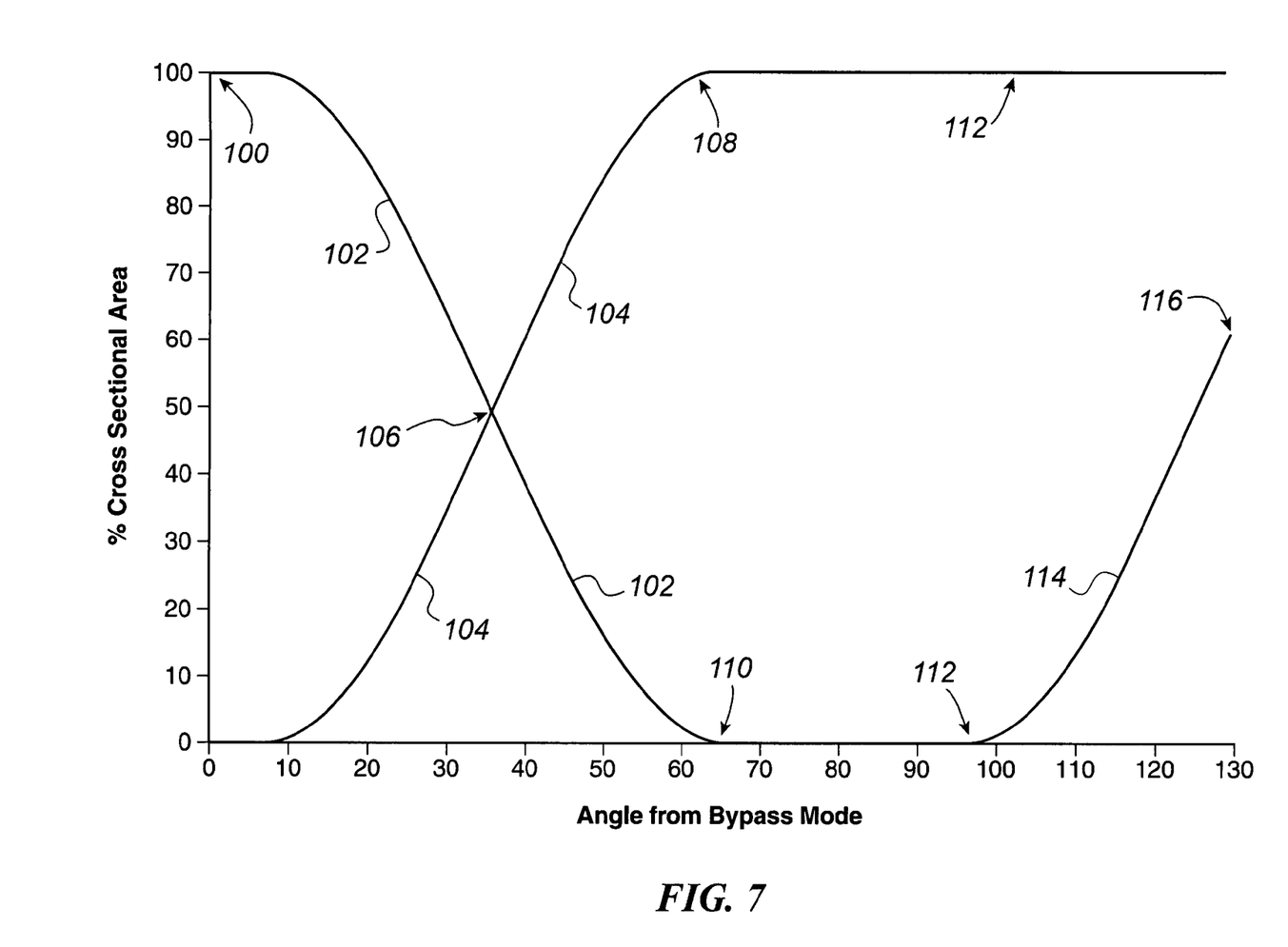
FIG. 7 is an example graphical illustration showing how the control valve of FIG. 1 distributes coolant between a front heater core, a rear heater core, and a bypass in the heating system of FIG. 3.

A graphical example of the distribution of heated coolant using the cylinder 14 is illustrated in FIG. 7. When the cylinder 14 is rotated from about zero to five degrees from the first position (see FIG. 2), the cross sectional area (i.e., flow area) of the aperture 66 exposed to the bypass outlet 20 is about one hundred percent as shown by reference number 100. After about five degrees of rotation, the cross sectional area of the aperture 66 open to the bypass outlet 20 begins to decrease as shown by line 102 and the cross sectional area of the aperture open to the front heater outlet 22 begins to increase as shown by line 104.

When the cylinder has been rotated a little more than thirty-five degrees, the cross sectional area of the aperture 66 open to each of the bypass outlet 20 and the front heater outlet 22 is about equal as shown by reference number 106. Beyond about thirty-five degrees of rotation, the cross sectional area of the aperture 66 open to the bypass outlet 20 continues to decrease as shown by the line 102 and the cross sectional area of the aperture open to the front heater outlet 22 increases as shown by the line 104. At about sixty-five degrees of rotation, the cross sectional area is at about one hundred percent to the front heater outlet 22 as shown by reference number 108 and about zero to the bypass outlet 20 as shown by reference number 110. The front heater outlet 22 enjoys the use of all of the heated coolant from the engine 80 until about ninety-five degrees of cylinder 14 rotation as shown by reference number 112.

After about ninety-five degrees of rotation is completed, the cross sectional area of the aperture 66 open to the rear heater outlet 24 begins to increase from zero as shown by line 114. As the cylinder 14 is rotated up to about one hundred thirty degrees, the cross sectional area of the aperture 66 exposed to the rear heater outlet 24 escalates up to above about sixty percent as shown by reference number 116. During the entire time the rear heater outlet 24 is brought to life, the cross sectional area of the aperture 66 open to the front heater outlet remains unchanged at about one hundred percent as shown by reference number 112. At about one hundred and thirty degrees, a balance of about sixty-two percent of the coolant flows to the front heater core 82 and about thirty-eight percent flows to the rear heater core 84. As the graph of FIG. 7 depicts, the heated coolant is proportionally distributed to the front and rear heater cores 82, 84 throughout a blending zone that extends from between about ninety-five to about one hundred thirty degrees.

From the foregoing, those skilled in the art will recognize that the flow control valve 10 simplifies the plumbing and packaging of the multiple heater system 76 of FIG. 3 without sacrificing the ability to control the individual heaters 82, 84. To accomplish this task, the flow control valve 10 uses the rotatable cylinder 14 as a passageway and as a coolant directing device. By incorporating the bypass outlet 20 into its overall design, the flow control valve 10 also permits continuous circulation of the coolant even when heat in the passenger compartment 92 is not called for or turned off. Therefore, the flow control valve 10 is not dead-headed. Moreover, the heated coolant is not undesirably carried into the passenger compartment 92 of the vehicle 76 such that the heater cores 82, 84 radiate heat on warm and hot days.

Those skilled in the art will also recognize from the foregoing that other orientations of the various outlets and configuration of the cylinder will provide different flow control and characteristics to the different outlets. Different ratios of coolant flow to the different outlets, including one hundred percent flow to each outlet individually, may be achieved through embodiments of the present invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flow control valve for selectively routing a coolant, comprising:
  a housing defining an internal cavity, the housing including an inlet port, a bypass outlet, a front heater outlet, and a rear heater outlet in fluid communication with the internal cavity, the inlet port being positioned about a first axis and the bypass outlet, the front heater outlet, and the rear heater outlet being co-planer with one another on a plane normal to the first axis, the bypass outlet and the front heater outlet being positioned on opposite sides of the housing and aligned about a second axis lying in the plane, the rear heater outlet being positioned about a third axis lying in the plane normal to the second axis; and a flow control device rotatably positioned within the internal cavity, the flow control device defining an axial channel positioned therein along the first axis and a generally radial channel in communication with the axial channel, the axial channel and the generally radial channel configured to provide selective fluid communication between the inlet port and the bypass outlet in a first position, between the inlet port and both the bypass outlet and the front heater outlet in a second position, between the inlet port and the front heater outlet in a third position, and between the inlet port and both the front heater outlet and the rear heater outlet in a fourth position.

2. The flow control valve of claim 1, wherein the inlet port, the bypass outlet, the front heater outlet, and the rear heater outlet are orthogonal to each other.

3. The flow control valve of claim 2, wherein the axial channel and the inlet port are axially aligned.

4. The flow control valve of claim 1, wherein the flow control device is configured such that the generally radial channel partially aligns with the bypass outlet and the front heater outlet to provide approximately equal fluid communication from the inlet port while blocking the rear heater outlet when rotated between about thirty-five and forty degrees relative to the first position.

5. The flow control valve of claim 1, wherein the flow control device is configured such that the generally radial channel fully aligns with the front heater outlet while blocking the bypass outlet and the rear heater outlet in the third position located between about sixty-five and ninety degrees relative to the first position.

6. The flow control valve of claim 1, wherein the flow control device is configured such that the generally radial channel fully aligns with the front heater outlet and at least partially aligns with the rear heater outlet while blocking the bypass outlet in the fourth position located between about ninety-five and one hundred degrees relative to the first position.

7. The flow control valve of claim 1, wherein the generally radial channel is configured to provide fluid communication between the inlet port and the front heater outlet and the rear heater outlet in a ratio of about sixty percent to about forty percent when the flow control device is rotated about one hundred and thirty degrees relative to the first position.

8. A flow control valve, comprising:

a housing defining an internal cavity and including an inlet port, a first outlet, a second outlet, and a third outlet in fluid communication with the internal cavity, the inlet port being positioned about a first axis and the first outlet, the second outlet, and the third outlet being co-planer with one another on a plane normal to the first axis, the first outlet and the second outlet being positioned on opposite sides of the housing and aligned about a second axis lying in the plane, the third outlet being positioned about a third axis lying in the plane normal to the second axis; and a cylinder rotatably positioned in the internal cavity, the cylinder defining a channel extending at least partially therethrough in communication with an aperture, the channel positioned to align with the inlet port, and the aperture positioned to selectively at least partially align with at least one of the first outlet, the second outlet and the third outlet to enable fluid communication between the inlet port and at least one of the first outlet, the second outlet and the third outlet in every rotational position thereof, the aperture being sized to provide fluid communication between the inlet port and both the first outlet and the second outlet in at least one rotational position.

9. The flow control valve of claim 8, wherein the cylinder including a blocking wall to selectively control fluid communication between the inlet port and at least one of the first outlet, the second outlet and the third outlet.

10. The flow control valve of claim 8, wherein the aperture is sized to provide fluid communication between the inlet port and the first outlet when the cylinder is rotated to a first position.

11. The flow control valve of claim 10, wherein the aperture is configured to provide an approximately equal amount of fluid communication to the first outlet and the second outlet when the cylinder is rotated between approximately thirty-five and forty degrees relative to the first position.

12. The flow control valve of claim 10, wherein the aperture is configured to provide fluid communication between the inlet port and only the second outlet when the cylinder is rotated between approximately sixty-five and ninety degrees relative to the first position.

13. The flow control valve of claim 10, wherein the aperture is configured to provide fluid communication between the inlet port and the second outlet and the third outlet when the cylinder is rotated between about ninety-five and one hundred degrees relative to the first position.

14. The flow control valve of claim 13, wherein the aperture is configured to provide about sixty percent of fluid entering the inlet port flows through the second outlet and about forty percent of the fluid entering the inlet port flows through the third outlet when the cylinder is rotated about one hundred and thirty degrees relative to the first position.

15. The flow control valve of claim 8, wherein the inlet port is positioned orthogonal to the first outlet, the second outlet, and the third outlet.

16. The flow control valve of claim 8, further comprising an actuator operatively coupled to the cylinder to control a position thereof.

17. An automotive dual-zone heater flow control valve, comprising:

a housing defining an internal cavity, the housing including an inlet port for receiving heated coolant from an engine coolant circuit, a front heater outlet for delivering heated coolant to a front heater core, a rear heater outlet for delivering heated coolant to a rear heater core, and a bypass outlet for returning heated coolant to the engine coolant circuit, the inlet port being positioned about a first axis and the bypass outlet, the front heater outlet, and the rear heater outlet being co-planer with one another on a plane normal to the first axis, the bypass outlet and the front heater outlet being positioned on opposite sides of the housing and aligned about a second axis lying in the plane, the rear heater outlet being positioned about a third axis lying in the plane normal to the second axis; and a flow control device rotatably positioned within the housing to provide selective fluid communication between the inlet port and at least one of the bypass outlet, the front heater outlet and the rear heater outlet in every rotational position of the flow control device such that the engine coolant circuit is not deadheaded.

* * * * *